US009694670B2

(12) United States Patent
Park et al.

(10) Patent No.: US 9,694,670 B2
(45) Date of Patent: Jul. 4, 2017

(54) UNDER COVER FOR HEAT SUCTION

(71) Applicant: Hyundai Motor Company, Seoul (KR)

(72) Inventors: Dang-Hee Park, Seoul (KR);
Yong-Beom Park, Gyeonggi-do (KR);
Bong-Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/944,440

(22) Filed: Nov. 18, 2015

(65) Prior Publication Data
US 2017/0008389 A1  Jan. 12, 2017

(30) Foreign Application Priority Data
Jul. 6, 2015 (KR) ........................ 10-2015-0095725

(51) Int. Cl.
*B60K 13/04* (2006.01)

(52) U.S. Cl.
CPC .................... *B60K 13/04* (2013.01)

(58) Field of Classification Search
CPC ........ B62D 11/085; B60K 11/08; B60K 13/04
See application file for complete search history.

(56) References Cited

U.S. PATENT DOCUMENTS

| 3,205,964 A * | 9/1965 | Henry-Biabaud | B60K 11/02 165/44 |
| 4,065,170 A * | 12/1977 | Fabian | B62D 35/00 180/68.2 |
| 4,598,786 A * | 7/1986 | Kirchweger | B60K 11/08 180/68.1 |
| 5,269,264 A * | 12/1993 | Weinhold | B60K 11/00 123/198 E |
| 5,322,340 A * | 6/1994 | Sato | B62D 25/20 180/68.1 |
| 5,490,572 A * | 2/1996 | Tajiri | B60H 1/00278 180/65.1 |
| 5,513,893 A * | 5/1996 | Nakata | B62D 35/02 180/68.2 |
| 8,347,830 B2 * | 1/2013 | Tregnago | B60K 11/00 123/41.04 |
| 8,752,660 B2 * | 6/2014 | Ajisaka | B60K 11/04 180/291 |

(Continued)

FOREIGN PATENT DOCUMENTS

| JP | 2000-280762 A | 10/2000 |
| JP | 2005-297843 A | 10/2005 |
| JP | 2006-347385 A | 12/2006 |

(Continued)

*Primary Examiner* — Hau Phan
(74) *Attorney, Agent, or Firm* — Mintz Levin Cohn Ferris Glovsky and Popeo, P.C.; Peter F. Corless

(57) ABSTRACT

An under cover for a heat suction is provided and includes a stagnant-air inlet unit into which stagnant air formed in an engine room is drawn and a communication pipe that is configured to communicate with the stagnant-air inlet unit and transmit the stagnant air, drawn into the stagnant-air inlet unit, to an under cover body. A stagnant-air outlet unit is configured to communicate with the communication pipe to exhaust the stagnant air, transmitted to the under cover body, out of the under cover body through the stagnant-air outlet unit, and the stagnant-air outlet unit is mounted to the under cover body.

10 Claims, 7 Drawing Sheets

(56) References Cited

U.S. PATENT DOCUMENTS

| | | | |
|---|---|---|---|
| 8,892,314 B2* | 11/2014 | Charnesky | B60K 11/085 180/68.1 |
| 8,950,533 B2* | 2/2015 | Nemesh | B60L 11/1812 165/72 |

FOREIGN PATENT DOCUMENTS

| | | |
|---|---|---|
| JP | 2007-038838 A | 2/2007 |
| JP | 2007-176284 A | 7/2007 |
| KR | 2005-0061229 A | 6/2005 |

* cited by examiner

UNDER COVER FOR HEAT SUCTION

CROSS-REFERENCE TO RELATED APPLICATIONS

This application claims priority to Korean Patent Application No. 10-2015-0095725, filed on Jul. 6, 2015, which is incorporated herein by reference in its entirety.

BACKGROUND

Field of the Invention

The present invention relates to under covers for heat suctions; and more particularly, to an under cover for a heat suction which prevents an air stagnation phenomenon in an engine room.

Description of Related Art

In general, internal-combustion engine vehicles are operated in such a way that a mixture gas of fuel and air is injected into a cylinder of an engine, and force of expansion resulting from compression of a piston is transmitted to drive wheels. Therefore, the engine includes a cooling device such as a water jacket to cool the engine that is heated to high temperature by explosion. A radiator cools cooling water circulated through the water jacket and external air is drawn into the engine room to cool the radiator. Furthermore, hybrid vehicles, which are environment-friendly vehicles and are provided with both a motor and an engine, are also configured such that external air is drawn into an engine room to cool heat generated from the engine, etc.

FIGS. 1 and 2 are views illustrating problems of a conventional technique according to the prior art. As shown in FIGS. 1 and 2, in the conventional technique, although external air is drawn into a vehicle (e.g., into an engine room) through a radiator grill or the like, disposed at the front end of the vehicle, a phenomenon of stagnation of air in the engine room of the vehicle is caused due to an insufficient air outlet in the engine room (refer to FIG. 1). Thus, air heated to a high temperature in the engine room may not be smoothly exhausted out of the engine room, whereby the ambient temperature in the engine room increases (refer to FIG. 2). Furthermore, due to the air stagnation phenomenon, the interior of the engine room is maintained in a relatively high-pressure state, thus impeding the supply of low-temperature external air into the engine room (refer to FIG. 1). Therefore, in the conventional technique, the temperature of air drawn from the interior of the engine room into the engine is comparatively high causing a reduction in efficiency and power performance of the vehicle.

SUMMARY

The present invention is directed to an under cover for a heat suction which is configured such that an interior of an engine room communicates with space below the under cover to solve an air stagnation phenomenon in the engine room by a difference in pressure between the interior of the engine room and the space below the under cover.

In accordance with an exemplary embodiment of the present invention, an under cover for a heat suction may include: a stagnant-air inlet unit (100) into which stagnant air formed in an engine room is drawn; a communication pipe (200) configured to communicate with the stagnant-air inlet unit (100) and transmit the stagnant air, drawn into the stagnant-air inlet unit (100), to an under cover body (400); a stagnant-air outlet unit (300) configured to communicate with the communication pipe (200) to exhaust the stagnant air, transmitted to the under cover body (400), out of the under cover body (400) through the stagnant-air outlet unit (300); and the under cover body (400) to which the stagnant-air outlet unit (300) is mounted.

The stagnant-air inlet unit (100) may include an inlet port (110) open toward an air stagnation area formed in the engine room; a first ventilation nozzle (120) that protrudes from a lower surface thereof and communicates with the communication pipe (200); and a mounting unit (130) configured to mount the stagnant-air inlet unit (100) in the engine room. The communication pipe (200) may include a plurality of communication pipes.

The stagnant-air outlet unit (300) may include: an outlet port (310) open in a direction in which external air flows when a vehicle moves; and a second ventilation nozzle (320) that protrudes from an upper surface thereof and communicates with the communication pipe (200). The under cover body (400) may include an under cover aperture (410) formed at a position where the stagnant-air outlet unit (300) is mounted to the under cover body (400). The stagnant-air outlet unit (300) and the under cover body (400) may be integrated with each other. The communication pipe (200) may include a single communication pipe and a cross-sectional area of a medial portion of the communication pipe (200) may be less than a cross-sectional area of each of opposite ends of the communication pipe (200). The stagnant-air inlet unit (100), the communication pipe (200), and the stagnant-air outlet unit (300) may be integrated with each other.

BRIEF DESCRIPTION OF THE DRAWINGS

A brief description of each drawing is provided to more sufficiently understand drawings used in the detailed description of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention. Therefore, the construction of the exemplary embodiment illustrated in the specification and the drawings must be regarded as only one illustrative example, and these are not intended to limit the present invention. Furthermore, it must be understood that various modifications, additions and substitutions are possible at the point of time of application of the present invention. Hereinafter, exemplary embodiments of the present invention will be described in detail with reference to the attached drawings.

Figure 1:
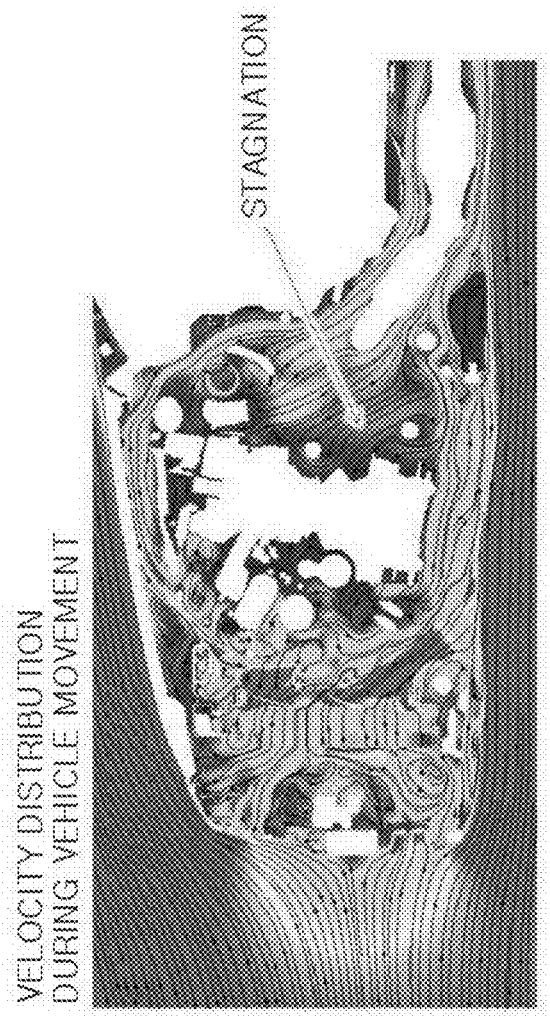
FIGS. 1 and 2 are views illustrating a problem of a conventional technique according to the prior art.
Figure 2:
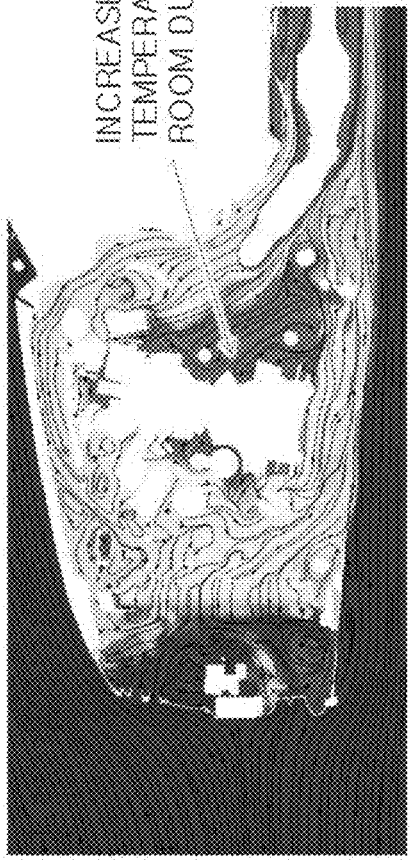
Figure 3:
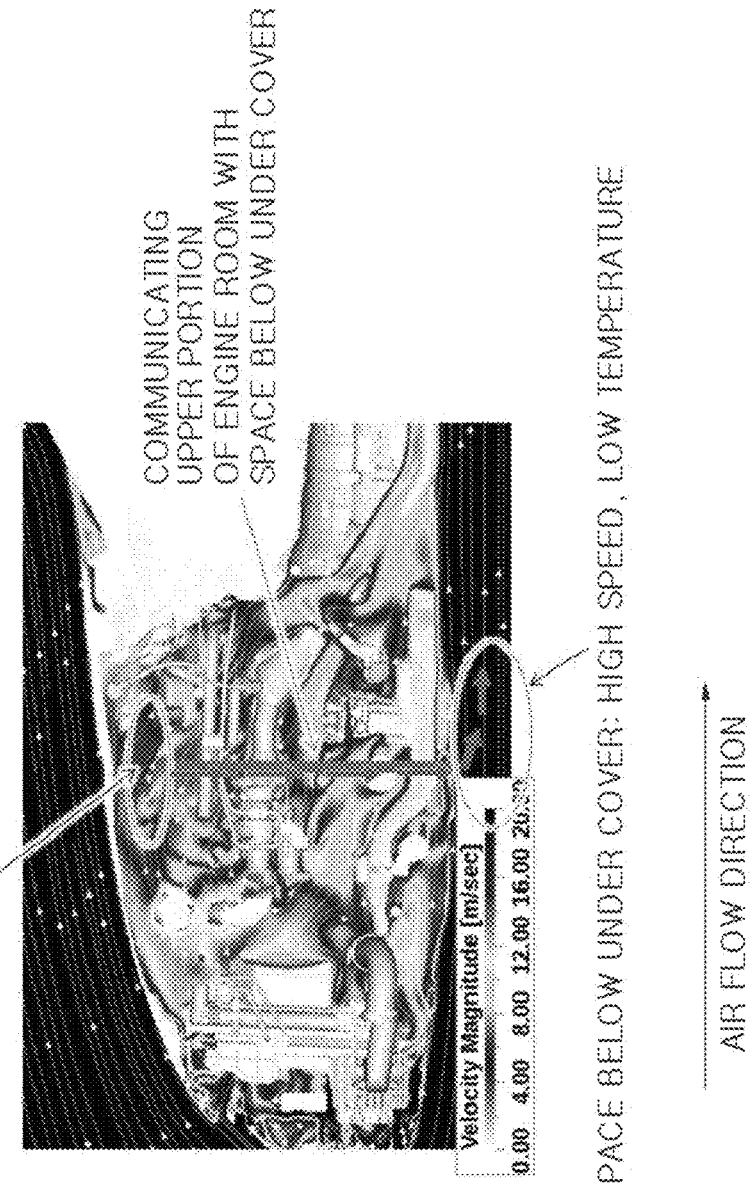
FIG. 3 is a view illustrating the principle of an under cover according to an exemplary embodiment of the present invention.
Figure 4:
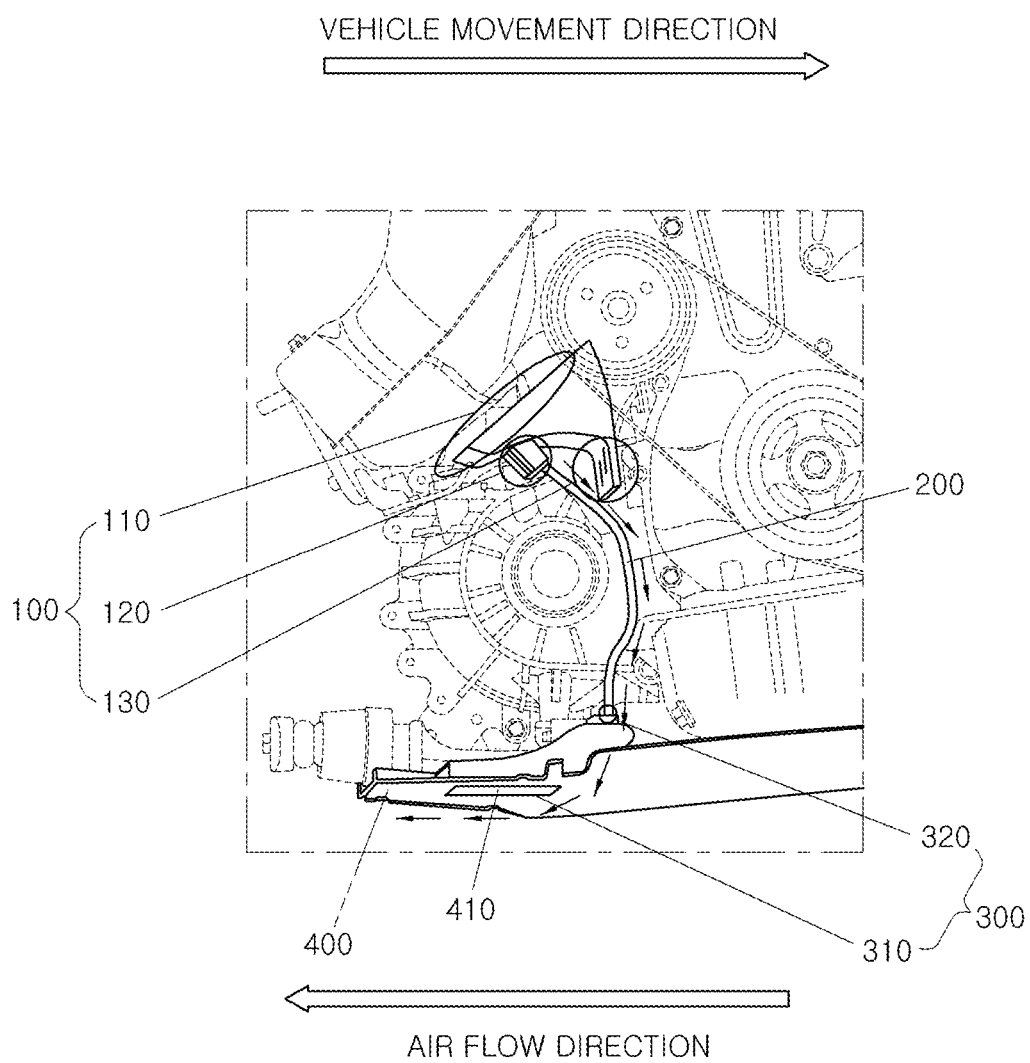
FIG. 4 is a side view of an under cover for a heat suction according to a first exemplary embodiment of the present invention.
Figure 5:
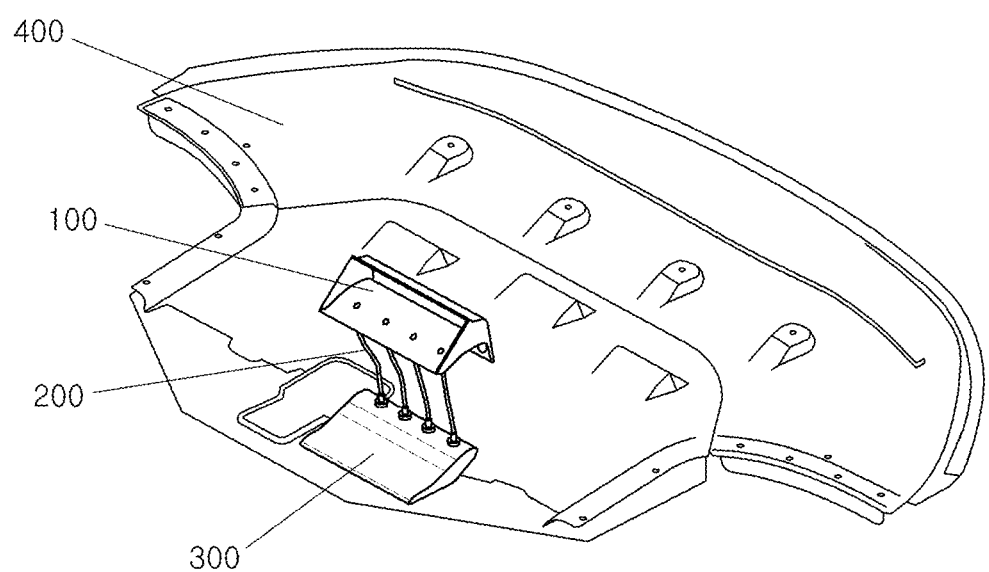
FIG. 5 is a perspective view of the under cover according to the first exemplary embodiment of the present invention.

FIG. 3 is a view illustrating the principle of an under cover according to an exemplary embodiment of the present invention. FIG. 4 is a side view of an under cover for a heat suction according to a first exemplary embodiment of the present invention. FIG. 5 is a perspective view of the under cover according to the first exemplary embodiment of the present invention. The under cover according to the present invention may be in communicates with an interior of an engine room, in which an air stagnation phenomenon may occur, and also with a space below the under cover and thus solves the air stagnation phenomenon by a difference in pressure therebetween (refer to FIG. 3). In other words, when a vehicle moves, the flow of air in the engine room is under conditions of relatively low speed and high pressure while the flow of air below the under cover is under conditions of relatively high speed and low pressure due to the movement of the vehicle.

Therefore, a difference in pressure is caused between the interior of the engine room and the space below the under cover. Accordingly, when the interior of the engine room communicates with the space below the under cover, high-temperature air in the engine room is exhausted to the space below the under cover. In this way, the air stagnation phenomenon in the engine room may be solved. Thereby, low-temperature external air may be drawn into the engine room and, simultaneously, high-temperature air may be exhausted out of the engine room. As a result, the ambient temperature in the engine room may be reduced.

Hereinafter, the configuration of the under cover according to the first exemplary embodiment of the present invention will be described in detail.

Referring to FIGS. 4 and 5, the under cover according to the first exemplary embodiment of the present invention may include a stagnant-air inlet unit 100, a communication pipe 200, a stagnant-air outlet unit 300 and an under cover body 400. The stagnant-air inlet unit 100 may be configured to suction stagnant air formed in the engine room and may include an inlet port 110 open toward an air stagnation area formed in the engine room, a first ventilation nozzle 120 which protrudes from a lower surface of the stagnant-air inlet unit 100 and communicates with the communication pipe 200, and a mounting unit 130 configured to mount the stagnant-air inlet unit 100 in the engine room.

The communication pipe 200 may be configured to communicate with the stagnant-air inlet unit 100 and transmit stagnant air, drawn into stagnant-air inlet unit 100, toward the under cover body 400. The communication pipe 200 may include a plurality of communication pipes 200. The stagnant-air outlet unit 300 may be configured to communicate with the communication pipe 200 and exhaust the transmitted stagnant air out of the under cover body 400. The stagnant-air outlet unit 300 may include an outlet port 310 open in a direction in which external air flows when the vehicle moves, and a second ventilation nozzle 320 which protrudes from an upper surface of the stagnant-air outlet unit 300 and that may be configured to communicate with the communication pipe 200. The stagnant-air outlet unit 300 may be mounted to the under cover body 400 which may include an under cover aperture 410 at a position at which the stagnant-air outlet unit 300 is mounted to the under cover body 400. The stagnant-air outlet unit 300 and the under cover body 400 may be integrated with each other.

Hereinbelow, the operation of the present invention will be described in detail.

When the vehicle moves (e.g., travels), air flows around the vehicle in a direction opposite from the direction in which the vehicle moves. In particular, an air stagnation phenomenon may occur in the engine room causing air to flow at relatively low speed in the engine room. Thus, the interior of the engine room enters a relatively high-pressure state. In contrast, below (e.g., underneath, beneath, etc.) the under cover body 400, air may flow at relatively high speed. The space below the under cover body 400 thus enters a relatively low-pressure state. As a result, a difference in pressure may be caused between the interior of the engine room and the space below the under cover body 400.

Therefore, low-speed and high-pressure air in the engine room may be drawn into the inlet port 100 and then transmitted to the communication pipe 200 via the first ventilation nozzle 120. Subsequently, the air may pass through the second ventilation nozzle 320 and the outlet port 310 and may then be exhausted to space below the under cover body 400 through the under cover aperture 410. Particularly, the outlet port 310 may be open in the direction in which external air flows when the vehicle moves to minimize resistance to exhaust of air when the vehicle moves and thus, the discharge of air out of the engine room may be facilitated.

Figure 6:
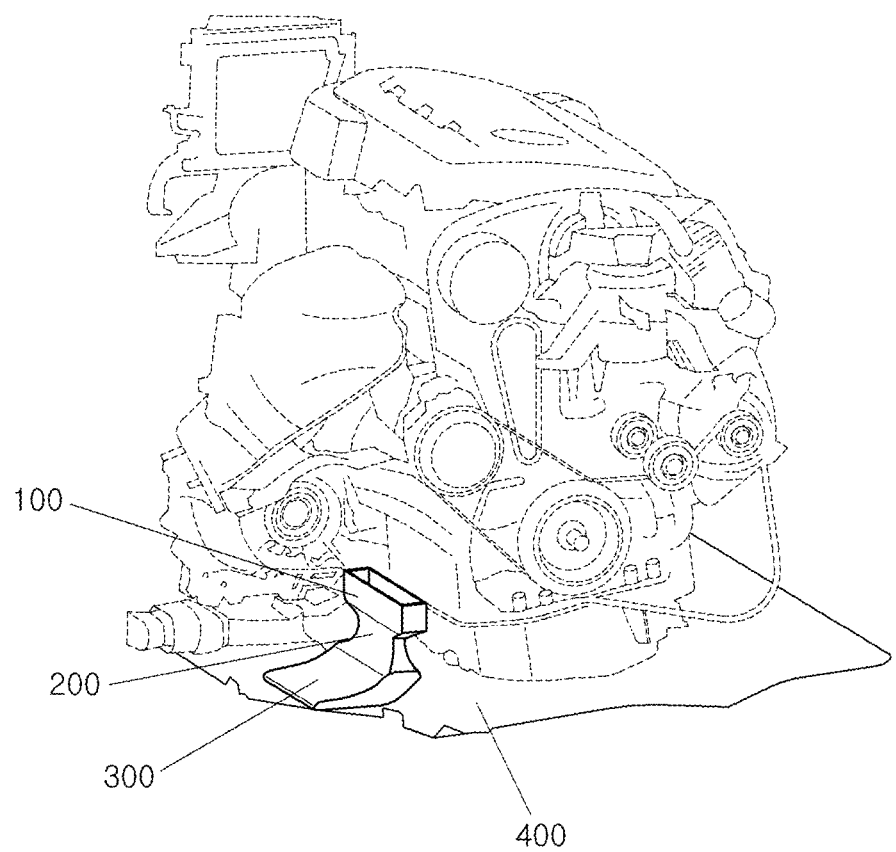
FIG. 6 is a side view of an under cover for a heat suction according to a second exemplary embodiment of the present invention.
Figure 7:
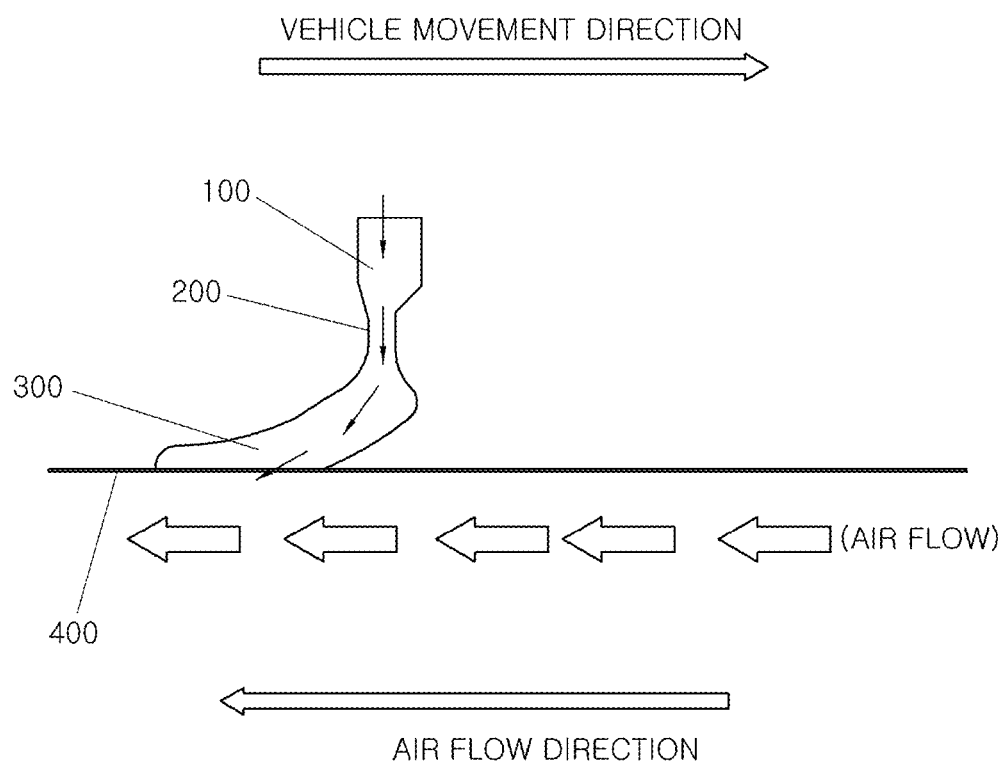
FIG. 7 is a side sectional view of the under cover according to the second exemplary embodiment of the present invention.

FIG. 6 is a side view of an under cover for a heat suction according to a second exemplary embodiment of the present invention. FIG. 7 is a side sectional view of the under cover according to the second exemplary embodiment of the present invention. Referring to FIGS. 6 and 7, the under cover according to the second exemplary embodiment of the present invention may include a single communication pipe 200 and the cross-sectional area of a medial portion of the communication pipe 200 may be less than that of each of the opposite ends of the communication pipe 200. The under cover according to the second exemplary embodiment may also include a stagnant-air inlet unit 100, the communication pipe 200, and a stagnant-air outlet unit 300 that may all be integrated with each other.

In other words, when there is a minimal distance or a minimal space limit between the stagnant-air inlet unit 100 and the stagnant-air outlet unit 300, the stagnant-air inlet unit 100, the communication pipe 200, and the stagnant-air outlet unit 300 may be integrally formed with each other to reduce the number of manufacturing processes. The result of a performance test of a vehicle with the under cover according to an exemplary embodiment of the present invention is shown in Table 1.

TABLE 1

| Temperature | Power performance | Operation section | Fuel efficiency |
|---|---|---|---|
| Intake temperature of engine room: reduced by 10° C. to 15° C. | Engine torque: enhanced by 3% to 5% | Entire section | Enhanced by 0.5% |
| Exhaust temperature of engine room: reduced by 10° C. | | Intermediate or high speed section | Enhanced by 1.0% |

As shown in Table 1, it may be understood that the air stagnation phenomenon in the engine room may be solved using the under cover according to an exemplary embodiment of the present invention, whereby the ambient temperature and intake/exhaust temperature in the engine room may be reduced. Consequently, it may also be appreciated that the power performance and fuel efficiency of the engine may be maximized.

As described above, in accordance with the present invention, air stagnation in an engine room may be solved. Thereby, the ambient temperature in the engine room can be reduced, and the temperature of air supplied from the engine room to the engine may also be reduced. As a result, the power performance and fuel efficiency of the vehicle may be maximized.

Although the specific exemplary embodiments of the present invention have been disclosed, they are only examples of the present invention to allow one having ordinary skill in the art (hereinafter, referred to as a 'skilled person') to easily implement the present invention. Therefore, the bounds of the present invention is not limited to the exemplary embodiments. The skilled person will appreciate that various modifications and changes are possible without departing from the technical spirit of the invention, and those modifications and changes belong to the scope of the accompanying claims.

What is claimed is:

1. An under cover for a heat suction, comprising:
 a stagnant-air inlet unit into which stagnant air formed in an engine room is drawn;
 a communication pipe configured to communicate with the stagnant-air inlet unit and transmit the stagnant air, drawn into the stagnant-air inlet unit, to an under cover body; and
 a stagnant-air outlet unit configured to communicate with the communication pipe to exhaust the stagnant air, transmitted to the under cover body, out of the under cover body through the stagnant-air outlet unit,
 wherein the stagnant-air outlet unit is mounted to the under cover body,
 wherein the stagnant-air inlet unit includes an inlet port open toward an air stagnation area formed in the engine room,
 wherein a cross-sectional area of the communication pipe is less than a cross-sectional area of each stagnant-air inlet unit and stagnant-air outlet unit.

2. The under cover of claim 1, wherein the stagnant-air inlet unit further includes:
 a first ventilation nozzle that protrudes from a lower surface thereof and communicates with the communication pipe.

3. The under cover of claim 2, wherein the stagnant-air inlet unit further includes:
 a mounting unit configured to mount the stagnant-air inlet unit in the engine room.

4. The under cover of claim 1, wherein the communication pipe includes a plurality of communication pipes.

5. The under cover of claim 1, wherein the stagnant-air outlet unit includes:
 an outlet port open in a direction in which external air flows when a vehicle moves.

6. The under cover of claim 5, wherein the stagnant-air outlet unit further includes:
 a second ventilation nozzle that protrudes from an upper surface thereof and communicates with the communication pipe.

7. The under cover of claim 1, wherein the under cover body includes an under cover aperture formed at a position at which the stagnant-air outlet unit is mounted to the under cover body.

8. The under cover of claim 1, wherein the stagnant-air outlet unit and the under cover body are integrated with each other.

9. The under cover of claim 1, wherein the communication pipe includes a single communication pipe and a cross-sectional area of a medial portion of the communication pipe is less than a cross-sectional area of each opposite end of the communication pipe.

10. The under cover of claim 9, wherein the stagnant-air inlet unit, the communication pipe, and the stagnant-air outlet unit are integrated with each other.

* * * * *